(12) United States Patent
Lodde

(10) Patent No.: US 6,797,654 B2
(45) Date of Patent: *Sep. 28, 2004

(54) TEXTILE ADHESIVE TAPE

(75) Inventor: Christoph Lodde, Dortmund (DE)

(73) Assignee: Coroplast Fritz Muller GmbH & Co. KG, Wuppertal (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/752,699

(22) Filed: Dec. 29, 2000

(65) Prior Publication Data

US 2004/0014390 A1 Jan. 22, 2004

(30) Foreign Application Priority Data

Dec. 29, 1999 (DE) ..................................... 299 22 950 U

(51) Int. Cl.⁷ ............................... B32B 7/12; C09J 7/02
(52) U.S. Cl. ....................... 442/151; 442/149; 428/343; 428/354; 428/355 AC
(58) Field of Search ................... 428/343, 354, 428/355 AC; 442/149, 151

(56) References Cited

U.S. PATENT DOCUMENTS 4,490,425 A * 12/1984 Knoke et al. ................. 428/90
5,629,078 A    5/1997 Ganschow
5,631,073 A    5/1997 Riedel et al.
6,383,958 B1 * 5/2002 Swanson et al. ............ 442/151

FOREIGN PATENT DOCUMENTS

| DE | 195 23 494 A1 | 1/1997 |
| DE | 298 19 014 U1 | 2/1999 |
| EP | 0 668 336 A1 | 8/1995 |
| WO | WO 99 24518 | 5/1999 |

OTHER PUBLICATIONS

European Search Report for DEU 29922950 filed Dec. 29, 1999.*

* cited by examiner

Primary Examiner—Daniel Zirker
(74) Attorney, Agent, or Firm—Merchant & Gould

(57) ABSTRACT

An adhesive tape having a tape-like textile support and an adhesive coating applied to the support, wherein the tape can be unwound easily ready for use without special covering or treatment of the adhesive coating. A tape-like support comprises at least partially a needle punched nonwoven from at least partially thermoplastic fibers, in which the thermoplastic fibers are bonded to each other at least partially by melting on the side opposite the adhesive coating. Melting of the fibers preferably occurs by one-sided heat calendering of the support material. The surface produced by treatment of the fiber material prevents unduly strong adhesion with the following layer during winding of the tape and tearing out of the fibers from their bond during unwinding of the tape. A cost-effective textile adhesive tape from needle punched nonwoven is therefore created without additional interliner.

3 Claims, 1 Drawing Sheet

TEXTILE ADHESIVE TAPE

Figure 1:
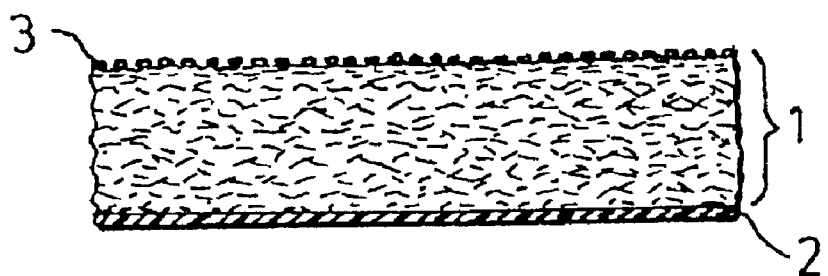

The present invention concerns an adhesive tape consisting of a tape-like textile support and an adhesive coating applied to the support.

Textile adhesive tapes are known in different variants and are used in a variety of ways. Textile adhesive tapes in which the textile support consists of viscose staple fabric has the drawback that it is costly and subject to decay because of the viscose staple fabric. Viscose staple fabric adhesive tapes are also known with an additional acrylate coating. However, production of this acrylate-coated support is very demanding and therefore very expensive. Textile adhesive tapes made of polyethylene terephthalate (PET) fabric are also connected with high manufacturing costs. Adhesives tapes that use needle punched nonwoven as textile support can only be produced as adhesive tapes that are wound onto themselves with an additional interliner, since needle punched nonwoven, because of its rough surface structure in the wound state, adheres so strongly that unwinding of the tape is no longer possible. Use of such interliners makes the production of such textiles tapes demanding and correspondingly cost-intensive.

The underlying task of the invention is to devise a textile adhesive tape of the type just described that can be unwound easily ready for use without special covering or treatment of the adhesive coating and does not exhibit the aforementioned drawbacks.

This is achieved according to the invention in that a tape-like support consists at least partially of a needle punched nonwoven from at least partially thermoplastic fibers, in which the thermoplastic fibers are bonded to each other at least partially by melting on the side opposite the adhesive coating.

Figure 2:
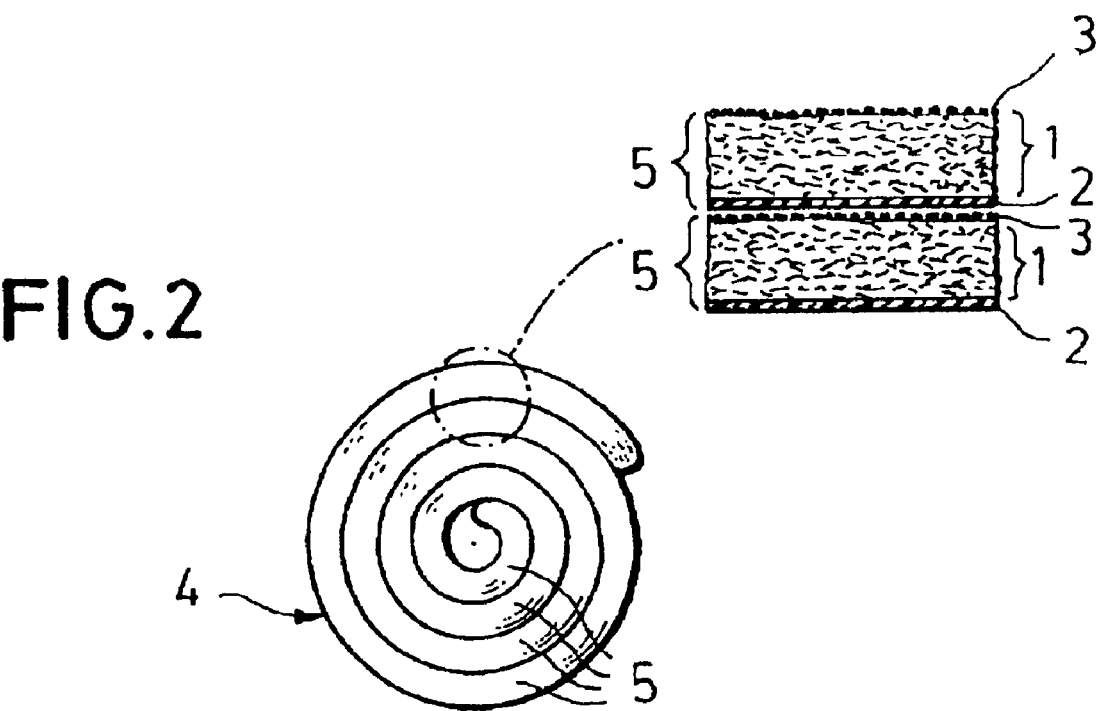

Such melting of the fibers preferably occurs by one-sided heat calendering of the support material. A surface is produced by treatment of the fiber material according to the invention, which prevents unduly strong adhesion with the following layer during winding of the tape and tearing out of the fibers from their bond during unwinding of the tape. A cost-effective textile adhesive tape from needle punched nonwoven is therefore created without additional interliner Other advantageous embodiments of the invention are contained in the subclaims. The invention is further explained with reference to the practical example depicted in the accompanying drawings. In the drawings:

FIG. 1 shows a partial section of the adhesive tape according to the invention in side view, FIG. 2 shows an adhesive tape according to the invention wound in the form of an Archimedes spiral in a side view.

As can be gathered from FIG. 1, an adhesive tape according to the invention consists of a tape-like support 1 from a textile nonwoven. This nonwoven is a textile fabric consisting of aligned and layered ordered and unordered fibers. It can consist of longitudinal, longitudinal and transverse or transverse fibers or a completely disordered fiber layer. The fibers are prestrengthened by mechanical needling. Such a needle punched nonwoven in the simplest variant consists of at least one fiber material. Use of at least two different fiber materials, however, is advantageous, since different properties of the nonwoven can be set in so doing. It is then decisive that the employed fiber materials have different melting points. Fibers with low melting point include fibers from the group of polyolefins, like polypropylene (PP) or polyethylene (PE), which can be melted at temperatures greater than 150° C. Fibers with high melting point include fibers from the group of polyols, like polyethylene terephthalate (PET) or polybutylene terephthalate fibers with a melting point >200° C. The following fiber blends can preferably be used:

| PP fibers | 99 to 1% |
|---|---|
| PET fibers | 1 to 99% |
| PE fibers | 80 to 50% |
| PBT fibers | 20 to 50% |

The needle punched nonwoven used according to the invention have basis weights of about 20 to 200 g/m$^2$.

As can be further gathered from the sketch, an adhesive layer 2 is arranged on one side of the tape-like textile support 1. This adhesive layer 2 consists of a pressure-sensitive adhesive. Natural or synthetic rubber adhesives, acrylate adhesives, or UV-crossed linkable acrylate adhesives can be used.

The tape textile support 1 has a melted and compacted surface 3 on the side opposite the adhesive layer 2. Melting of the surface advantageously occurs by one-sided calendering of the needle punched nonwoven under heat exposure with pressure and is necessary in order for an adhesive tape wound onto itself to be produced. The calendering temperature is 170 to 190° C. When fibers with different melting points are used, only the fiber that has a correspondingly low melting point is selectively melted by adjusting the temperature of the calendering rolls. The meltable fiber therefore determines the strength properties and cohesion properties of the adhesive tape. The employed fiber with the higher melting point, on the other hand, remains unmelted and forms the base for the textile character of the tape (softness of the nonwoven, cushioning properties). Depending on the blend of fibers, nonwovens with high or low tensile strength can be produced. The higher the percentage of fibers with lower melting point, the higher the degree of sealing of the surface.

The following application examples can be accomplished based on the textile adhesive tape according to the invention:

Cable winding tape with antinoise properties, whose tape-like textiles support 1 consists especially of 50% PP fibers and 50% PET fibers and has a basis weight of 100 g/m$^2$. A synthetic rubber adhesive with a surface density of 130 g/m$^2$ is preferably used as adhesive.

General purpose tape with a tape-like textile support 1 consisting of 80% PP fibers and 20% PET fibers with a basis weight of 50 g/m$^2$. Synthetic rubber adhesives with a surface density of 130 g/m$^2$ are also used as adhesive.

Masking tape with 80% PP fibers and 20% PET fibers in needle punched nonwoven and a basis weight of 50 g/m$^2$. A UV-crosslinkable acrylate adhesive having a surface density of 100 g/m$^2$ is used as adhesive.

The employed polyester fibers have a thickness of 1.5 dtex and a length of 60 mm. The polypropylene and polyethylene fibers have a thickness of 4.4 dtex and a length of 60 mm.

As can be gathered from FIG. 2, the adhesive tape according to the invention can be wound in the form of an Archimedes spiral to a roll 4, in which the adhesive tape layers 5 lie directly one on the other. It is therefore simple to handle and transport. Because of the precisely adjustable unwinding resistance from the manufacturing method, unwinding can be guaranteed without tearing out of fibers from the fiber bond. The adhesive tape is excellently suited for mechanical processing on this account.

The invention is not restricted to the depicted and described practical example, but it also embraces all variants that are equivalent according to the invention. This means that in principle almost any individual feature of the claims can be omitted and replaced by at least one individual feature disclosed elsewhere in the application.

What is claimed is:

1. An adhesive cable winding tape with anti-noise properties, comprising:

a tape-like textile support (1); and a pressure sensitive adhesive coating (2) applied to one side of the tape-like textile support, the adhesive coating consisting essentially of synthetic rubber adhesive having a surface density of 130 g/m$^2$;

the tape-like textile support consisting essentially of a needle punched nonwoven which is fabricated of a first fiber material consisting essentially of polypropylene fibers and a second fiber material consisting essentially of polyethylene terephthalate fibers, and which has a basis weight of 100 g/m$^2$;

in which said first fiber material and second fiber material are bonded to each other on another side of the tape-like textile support opposite the adhesive coating by melting at a predetermined temperature;

said two fiber materials having different melting points, whereby the melting point of said first fiber material is not less than 150° C. and lower than said predetermined temperature, and the melting point of said second fiber material is higher than 200° C. and higher than said predetermined temperature; and wherein the polypropylene fibers and the polyethylene terephthalate fibers each have a thickness of essentially 4.4 dtex and a length of essentially 60 mm, whereby the adhesive tape can be wound onto itself without use of release sheets or release coatings and unwound easily ready for use without tearing of the fibers.

2. A general-purpose adhesive tape, comprising:

a tape-like textile support (1); and a pressure sensitive adhesive coating (2) applied to one side of the tape-like textile support, the adhesive coating consisting essentially of synthetic rubber adhesive having a surface density of 130 g/m$^2$;

the tape-like textile support consisting essentially of a needle punched nonwoven which is fabricated of a first fiber material consisting essentially of polypropylene fibers and a second fiber material consisting essentially of polyethylene terephthalate fibers, and which has a basis weight of 50 g/m$^2$;

in which said first fiber material and second fiber material are bonded to each other on another side of the tape-like textile support opposite the adhesive coating by melting at a predetermined temperature;

said two fiber materials having different melting points, whereby the melting point of said first fiber material is not less than 150° C. and lower than said predetermined temperature, and the melting point of said second fiber material is higher than 200° C. and higher than said predetermined temperature; and wherein the polypropylene fibers and the polyethylene terephthalate fibers each have a thickness of essentially 4.4 dtex and a length of essentially 60 mm, whereby the adhesive tape can be wound onto itself without use of release sheets or release coatings and unwound easily ready for use without tearing of the fibers.

3. A masking tape, comprising:

a tape-like textile support (1); and a pressure sensitive adhesive coating (2) applied to one side of the tape-like textile support, the adhesive coating consisting essentially of a UV-crosslinkable acrylate adhesive a surface density of 100 g/m$^2$;

the tape-like textile support consisting essentially of a needle punched nonwoven which is fabricated of a first fiber material consisting essentially of polypropylene fibers and a second fiber material consisting essentially of polyethylene terephthalate fibers, and which has a basis weight of 50 g/m$^2$;

in which said first fiber material and second fiber material are bonded to each other on another side of the tape-like textile support opposite the adhesive coating by melting at a predetermined temperature;

said two fiber materials having different melting points, whereby the melting point of said first fiber material is not less than 150° C. and lower than said predetermined temperature, and the melting point of said second fiber material is higher than 200° C. and higher than said predetermined temperature; and wherein the polypropylene fibers and the polyethylene terephthalate fibers each have a thickness of essentially 4.4 dtex and a length of essentially 60 mm, whereby the adhesive tape can be wound onto itself without use of release sheets or release coatings and unwound easily ready for use without tearing of the fibers.

* * * * *

UNITED STATES PATENT AND TRADEMARK OFFICE
CERTIFICATE OF CORRECTION

PATENT NO. : 6,797,654 B2
DATED : September 28, 2004
INVENTOR(S) : Christoph Lodde It is certified that error appears in the above-identified patent and that said Letters Patent is hereby corrected as shown below:

<u>Column 4,</u>
Line 19, insert -- adhesive -- immediately following "masking".
Line 25, insert -- having -- immediately following "adhesive".

Signed and Sealed this

First Day of February, 2005

JON W. DUDAS
*Director of the United States Patent and Trademark Office*